UNITED STATES PATENT OFFICE.

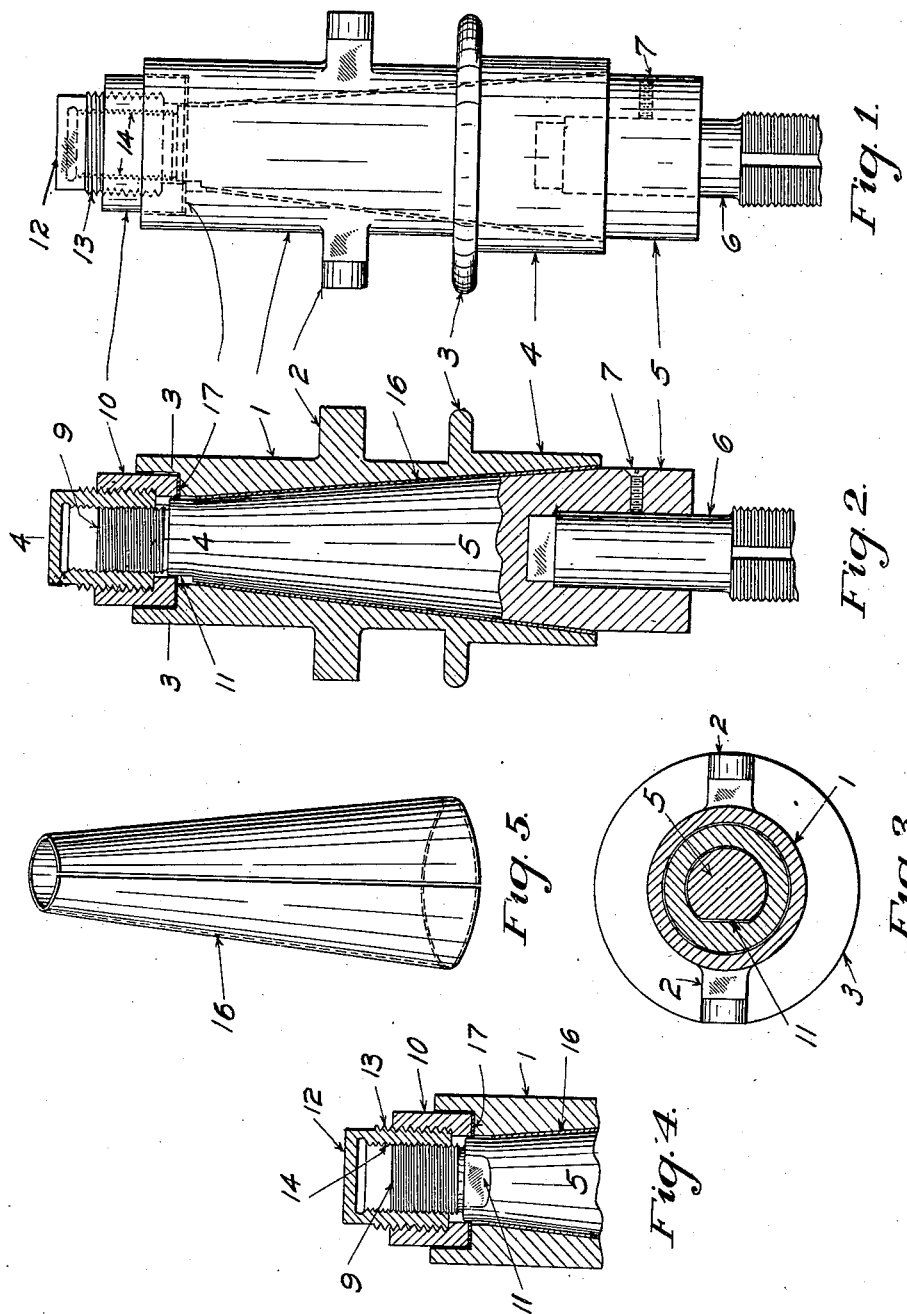

FRANK P. MILLER, OF MEADVILLE, PENNSYLVANIA, ASSIGNOR TO McCROSKY REAMER COMPANY, OF MEADVILLE, PENNSYLVANIA, A CORPORATION OF PENNSYLVANIA.

YIELDING TAPPING ATTACHMENT.

991,630. Specification of Letters Patent. Patented May 9, 1911.

Application filed April 11, 1910. Serial No. 554,857.

*To all whom it may concern:*

Be it known that I, FRANK P. MILLER, a resident of Meadville, in the county of Crawford and State of Pennsylvania, have invented a new and useful Improvement in Yielding Tapping Attachments, of which the following is a specification.

This invention relates to a tap holder for use with an ordinary drill press or tapping machine.

The object of the invention is to provide a holder which will permit the tap to stop when it bottoms or strikes an obstruction of any kind and thereby prevent injury to the tap, or the work, or both.

The invention comprises the construction and arrangement of parts hereinafter described and claimed.

In the accompanying drawing, Figure 1 is a side view of the improved tap holder showing the tap therein; Fig. 2 is a vertical section through the same; Fig. 3 is a horizontal section taken on the line 3—3 of Fig. 2; Fig. 4 is a vertical section through the upper part of the device on the line 4—4, Fig. 2; and Fig. 5 is a perspective view of the conical bushing or sleeve.

The tap holder shown comprises a body 1 of any suitable size or shape, and which may be varied to suit any existing drill chuck or for attachment to the spindle of an ordinary drill press or similar tapping machine. The particular body shown is designed for use in connection with a drill chuck such as shown in Patent No. 931327, dated August 17, 1909. This body is circular in cross section and is provided with oppositely extending lugs 2 for entering the slots or notches of the particular chuck referred to. This body is provided with a collar 3 and the lower portion 4 is somewhat enlarged. The body is provided with an axial bore which tapers upwardly as shown in Fig. 2. In this axial bore is a central portion or core 5 which has a shape corresponding to the bore in the body, and which at its lower end is suitably shaped for the attachment of the tap 6 thereto. As shown in the drawing, the core 5 is merely provided with a suitable socket for receiving the shank of the tap which is held in place by set screw 7, or in any suitable manner. The upper end of the core is reduced, and provided with an externally threaded extension 9, which extends through an opening in a circular member 10 which is internally threaded as shown. The upper end of the core is slightly flattened on one side, as at 11, and the opening in member 10 through which it extends has a corresponding straight side so that the member 10 is held against rotation on the core. The member 10 preferably is situated in a depression in the upper end of the body 1 as shown, although this is not essential. In any event, the member 10 is rotatable with reference to the body 1.

The member 10 and core are adjustably connected by means of a differential nut 12, this having external threads 13 coöperating with the internal threads of the member 10, and internal threads 14 engaging the threaded extension 9 of the core. The internal and external threads of the nut and the corresponding threads of the core and of the member 10, respectively, are of different pitches, although running in the same direction, so that by turning the nut 12 a very fine adjustment can be secured and, obviously, a great power exerted thereby. By suitably rotating the nut 12 the tapering core 5 is drawn into the axial bore in the body 1, and, obviously, any degree of friction between the core and body 1 can be secured by properly adjusting the nut. This is necessary in order to adapt the holder to different sized taps or for tapping different kinds of work.

Inasmuch as it is practically necessary to form all parts of the holder of steel in order to get the necessary strength, it is necessary to provide between the core and body sleeves or washers of some other kind of material, in order to secure a more uniform frictional effect. As shown, interposed between the tapering core and the walls of the axial bore in the body 1, is a sleeve or bushing 16, which preferably is formed from a thin sheet of fiber, although it may be of metal of a different character than steel. Similarly, interposed between the bottom of the member 10 and the top face of the body 1 against which it bears is a washer 17 which also preferably is formed of fiber.

In the use of the device the tap is secured to the core 1 and the holder and tap are inserted in the chuck of the tapping machine or drill press, or secured to the spindle of the machine, depending upon the construction of the holder or form of chuck or drill press employed. The nut 12 will have been adjusted so as to secure the desired degree of frictional binding of the core in the body, depending upon the character of the work or size of tap. The frictional adjustment will be sufficient to insure the rotation of the tap with the body 1 while performing its intended and normal cutting. Should the tap, however, bottom in the hole or meet with any unexpected and unusual resistance, the frictional drive yields, allowing the body 1 to rotate on the tapered core, thereby permitting the tap to stop and preventing injury to the tap, or to the work, or to both.

I am aware that frictional driving means for taps have heretofore been provided. The device described, however, has numerous important advantages, namely,—it is very compact so that it occupies a minimum amount of space and weight and is not in the way so as to interfere with the work; it can be marketed at a comparatively small cost; by means of it a very sensitive and powerful adjustment can be secured; and it is also possible, by means thereof, for each size of tap to have its own frictional drive so that it saves time in changing from one size tap to another as must frequently be done, there being no necessity for adjusting the frictional device between changes, as each tap and its holder are independently adjusted.

What I claim is:

1. A tap holder comprising a body constructed for connection to a drill press spindle or chuck and provided with an axial tapered bore, a tapered core arranged to enter said bore and formed at its lower end to receive the tap, and an adjusting member of less diameter than the body and having a threaded connection with the upper end of the core and arranged to draw the same into the body.

2. A tap holder comprising a body constructed for connection to a drill press spindle or chuck and provided with an axial tapered bore, a tapered core arranged to enter said bore and formed at its lower end to receive the tap, an adjusting member of less diameter than the body and having a threaded connection with the upper end of the core and arranged to draw the same into the body, and a sleeve of material different from the body and core interposed between the core and body.

3. A tap holder comprising a body constructed for connection to a drill press spindle or chuck and provided with an axial tapered bore, a tapered core arranged to enter said bore and formed at its lower end for receiving the tap, a fiber sleeve interposed between the core and bore of the body, and members provided respectively with threads of different pitches and arranged to draw the core into the body.

4. A tap holder comprising a body constructed for connection to a drill press spindle or chuck and provided with an axial tapered bore, a tapered core in said bore and formed at its lower end for receiving the tap, and differential screw mechanism arranged to draw the core into said body.

5. A tap holder comprising a body constructed for connection to a drill press spindle or chuck and provided with an axial tapered bore, a tapered core arranged to enter said bore and formed at its lower end for receiving the tap, an internally threaded member rotatable on the body, and a differential nut threaded externally to engage said internally threaded member and threaded internally and engaging a threaded portion of the core.

6. A tap holder comprising a body for connection to a drill press spindle or chuck and provided with an axial tapered bore, a tapered core in said bore and formed at its lower end to receive the tap, an internally threaded member rotatable with reference to the body but axially immovable thereon, a differential nut threaded externally to engage said internally threaded member and threaded internally and engaging a threaded portion of the core, a friction sleeve between the core and bore of the body, and a friction washer between the internally threaded member and body.

In testimony whereof, I have hereunto set my hand.

FRANK P. MILLER.

Witnesses:
M. J. HOLZER,
FRANK WALSTER.

---

Copies of this patent may be obtained for five cents each, by addressing the "Commissioner of Patents, Washington, D. C."